UNITED STATES PATENT OFFICE.

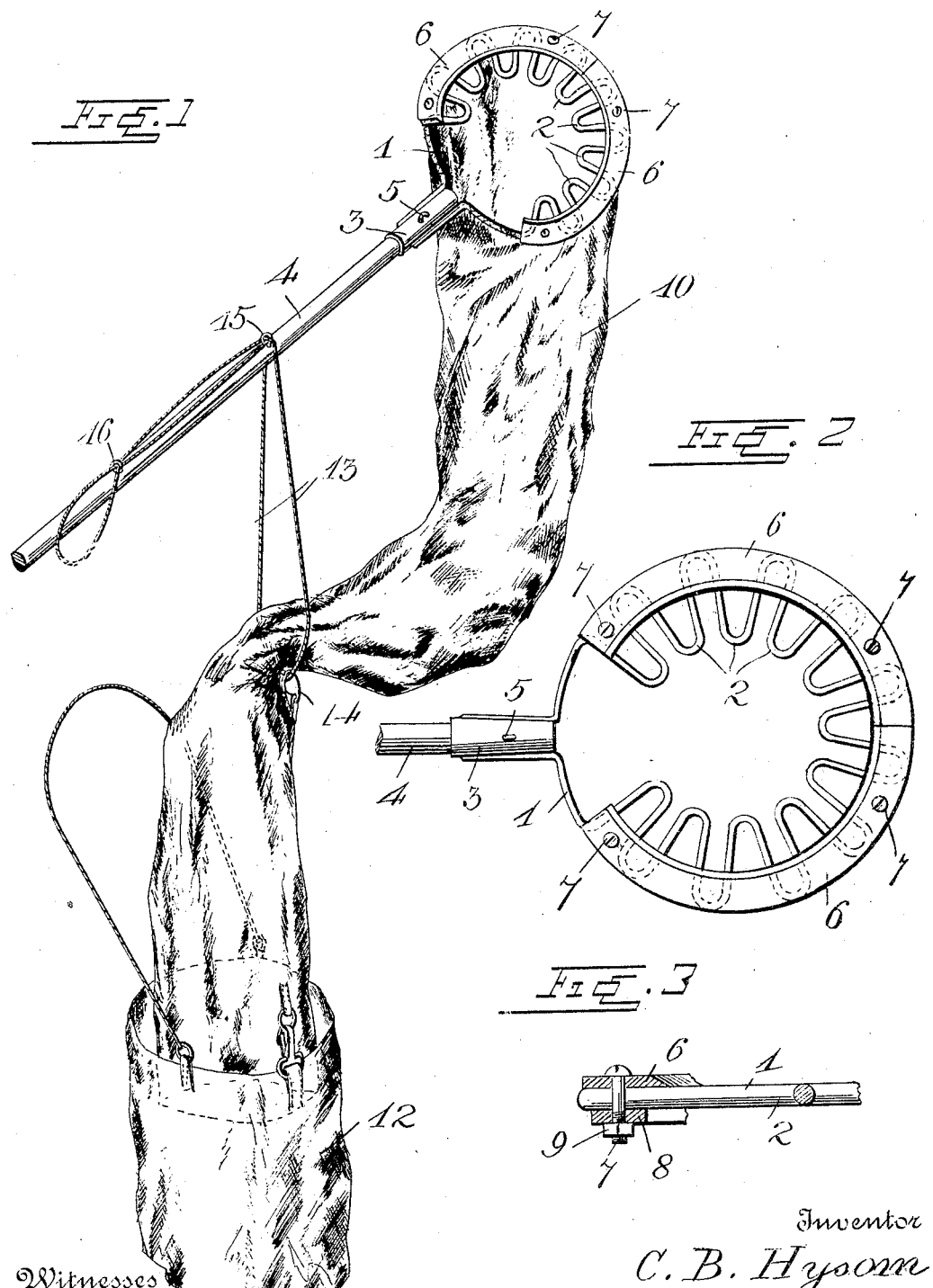

CORNELIUS B. HYSOM, OF EVERETT, WASHINGTON.

FRUIT-PICKER.

No. 803,167.   Specification of Letters Patent.   Patented Oct. 31, 1905.

Application filed June 5, 1905. Serial No. 263,810.

*To all whom it may concern:*

Be it known that I, CORNELIUS B. HYSOM, a citizen of the United States, residing at Everett, in the county of Snohomish and State of Washington, have invented certain new and useful Improvements in Fruit-Pickers; and I do declare the following to be a full, clear, and exact description of the invention, such as will enable others skilled in the art to which it appertains to make and use the same.

This invention relates to improvements in fruit-pickers.

The object of the invention is to provide a fruit-picker by which the fruit may be readily detached from a tree and conducted to a suitable receptacle without scarring or bruising the same.

A further object is to provide a device of this character which will be simple, strong, durable, and inexpensive in construction and well adapted to the purpose for which it is designed.

With these and other objects in view the invention consists of certain novel features of construction, combination, and arrangement of parts, as will be hereinafter described and claimed.

In the accompanying drawings, Figure 1 is a perspective view of the picker. Fig. 2 is an enlarged plan view of the supporting-ring and handle of the picker; and Fig. 3 is a detail sectional view through a portion of the supporting-ring and the severing-knife, showing the manner of connecting said knife to the ring.

Referring more particularly to the drawings, 1 denotes the supporting-ring, which around the outer portion of the same is bent to form a series of loops 2. The ends of the wire or rod forming the rings are bent at an angle thereto on the opposite side of the ring from the loops 2 and are secured to a ferrule which is adapted to be secured on the end of a rod or handle 4 in any suitable manner. Said ferrule is here shown as secured to the end of a rod by means of a pin 5, which is passed through an aperture formed in the upper side of the ferrule and into the end of the rod. Secured to the looped portion of the ring, on the upper side thereof, is a curved severing-knife, said knife being preferably arranged on and secured to the ring in the form of two or more segmental blades. Through these blades are passed short bolts 7, said bolts also passing through apertured plates 8, arranged on the under side of the looped portion of the ring, and on said bolts are screwed clamping-nuts 9, which when screwed up securely hold the blades of the knife in place. Connected to the under side of the ring is the upper end of a chute 10, said chute being formed of fabric or other flexible material and is preferably tubular in shape and of sufficient length to extend from the ring on the end of the handle to a bag or receptacle 12, suspended from the shoulders of or carried by the operator. If desired, the chute 10 may be made up of a series of sections suitably connected together by buttons or other fastening devices. In order that tender fruits may be picked without bruising the same, the chute 10 may be looped up near its outer end to form a shallow receptacle into which the fruit will fall when detached by the picker. The chute may be looped up to form the receptacle at the will of the operator by means of a looped cord 13, which passes around the chute near the upper end thereof and through a guide-ring 14, secured to the under side of the chute, thence around the handle and through a guide-eye 15, secured to the upper side of the handle, said cord after passing through the eye 15 extending along the handle to the inner end of the same, at which point the cord passes through a second eye 16 and is then provided with a loop which is slipped over the hand of the operator. While but one looping-cord 13 is shown and described, a number of such cords may be employed along the length of the pole, if desired, thereby permitting the chute to be looped up to form a series of receptacles by which the fruit may be gradually lowered to the main receptacle or bag 12, carried by the operator.

While I have shown and described the knife 6 in the form of a series of blades, it is obvious that the same may be formed in one piece, if so desired.

A fruit-picker constructed as herein shown and described will be found to be extremely convenient in picking all varieties of fruit and may be used with or without severing-blades. The construction of the picker is such that the same may be used by one hand.

From the foregoing description, taken in connection with the accompanying drawings, the construction and operation of the invention will be readily understood without requiring a more extended explanation.

Having thus described my invention, what

I claim as new, and desire to secure by Letters Patent, is—

1. In a fruit-picker the combination with a suitable handle, of a fruit-engaging ring removably connected with said handle, loops formed in said ring to engage the stems of the fruit, a curved knife secured to said loops to sever said stems, a receptacle to receive the fruit, a chute to catch and conduct the severed fruit to said receptacle, guide-rings on the handle and cords passing through said rings whereby said chute is drawn and held up to form receptacles to catch the fruit, substantially as described.

2. In a fruit-picker the combination with a suitable handle, of a fruit-engaging ring removably connected with said handle, loops formed in said ring to engage the stems of the fruit, a knife secured to said loops to sever said stems, a flexible chute to catch and conduct the fruit to a receptacle, cords connected to said chute to draw the same up at intervals along said handle thereby forming pockets or receptacles to catch the fruit, substantially as described.

3. In a fruit-picker the combination with a suitable handle of a fruit-engaging ring removably connected with said handle, loops formed in said ring to engage the stems of the fruit, a knife secured to said loops to sever said stems, a receptacle adapted to be carried by the operator, a flexible chute to catch and conduct the fruit to said receptacle, cords connected to said chute to draw the same up thereby forming pockets or receptacles in the chute, and means whereby said cords are guided and conducted to within convenient reach of the operator, substantially as described.

In testimony whereof I have hereunto set my hand in presence of two subscribing witnesses.

CORNELIUS B. HYSOM.

Witnesses:
 THOMAS W. COBB,
 L. T. FOLSOM.